United States Patent
Degwekar et al.

(10) Patent No.: US 11,733,899 B2
(45) Date of Patent: Aug. 22, 2023

(54) INFORMATION HANDLING SYSTEM STORAGE APPLICATION VOLUME PLACEMENT TOOL

(71) Applicant: Dell Products L.P., Round Rock, TX (US)

(72) Inventors: Anil A. Degwekar, Bangalore (IN); Akash Shendge, Gangakhed (IN); Arindam Datta, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/497,365

(22) Filed: Oct. 8, 2021

(65) Prior Publication Data
US 2023/0111859 A1 Apr. 13, 2023

(51) Int. Cl.
*G06F 3/00* (2006.01)
*G06F 3/06* (2006.01)

(52) U.S. Cl.
CPC .......... *G06F 3/0644* (2013.01); *G06F 3/0604* (2013.01); *G06F 3/067* (2013.01)

(58) Field of Classification Search
None
See application file for complete search history.

(56) References Cited

U.S. PATENT DOCUMENTS

| | | |
|---|---|---|
| 10,387,899 B2 | 8/2019 | Fighel |
| 10,708,135 B1 | 7/2020 | Elliott |
| 10,917,339 B2 | 2/2021 | Pianigiani et al. |
| 10,999,163 B2 | 5/2021 | Abraham |
| 11,038,784 B2 | 6/2021 | Nickolov et al. |
| 11,210,143 B1 * | 12/2021 | Dubey .................. G06F 9/4881 |
| 2015/0134928 A1 * | 5/2015 | Goodman ............. G06F 3/0644 711/170 |
| 2021/0132831 A1 * | 5/2021 | Zhuo .................... G06F 11/3442 |

* cited by examiner

*Primary Examiner* — Midys Rojas
(74) *Attorney, Agent, or Firm* — Zagorin Cave LLP; Robert W. Holland

(57) ABSTRACT

Storage volume placement in a selected of plural storage arrays interfaced with a network is managed by an Ansible module having a placement role that identifies storage resource pools of the network, compares the storage resource pool characteristics against storage volume constraints and lists acceptable storage resource pools in a priority order that allows automated selection of a storage resource pool for storage volume placement. In one embodiment, the network is searched for storage group names associated with the storage volume placement request to check for idempotency.

14 Claims, 5 Drawing Sheets

US 11,733,899 B2

INFORMATION HANDLING SYSTEM STORAGE APPLICATION VOLUME PLACEMENT TOOL

BACKGROUND OF THE INVENTION

Field of the Invention

The present invention relates in general to the field of information handling system storage systems, and more particularly to an information handling system storage application volume placement tool.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Enterprises often manage large amounts of information relating to a variety of applications that execute on information handling systems. For example, a typical enterprise has internal engineering teams that design and test products and services; marketing teams that coordinate a public face of the products and services; and sales teams that sell the products and services to the public. Enterprises generally must store information related to applications for each separate activity and make the information readily available for use by employees. Typically, enterprises have information technology (IT) professionals who manage storage of and access to enterprise information. Solutions for managing stored information include internal storage networks and cloud-based storage networks. At a physical level, information storage is often provided by distributed storage devices, such as network attached storage (NAS), storage area networks (SAN) or similar storage resources generally referred to herein as storage arrays. Distribution of storage resources across multiple physical locations helps improve information security against loss, such as by maintaining storage back-ups at different locations. Often such storage is maintained as an abstraction by IT professionals so that end users have storage available without being concerned about the physical location and operation of storage devices.

One difficulty with network storage is that an enterprise often has multiple physical storage systems in a given network environment. When multiple storage systems are available, IT professionals typically face a challenge in defining where to place volumes related to storage for applications. Poor volume placement can lead to suboptimal storage utilization in the network environment. Ansible modules, such as are available from RED HAT, are sometimes used in storage systems as a tool to help IT professionals with storage provisioning and management operations. For block provisioning, the ansible modules take storage array serial numbers and storage pools as parameters to decide where to provision a volume. For file provisioning, the ansible modules take the storage system serial number/cluster identifier and the NAS server as parameters to decide where to provision the file storage. If IT professionals decide on an ad hoc basis where to place volumes, suboptimal storage utilization may result in provisioning requests that fail. For instance, a selected storage array may be full whereas another array has sufficient storage space. Overall, IT professionals often have difficulty to keep volume placement decisions within an Ansible playbook.

Another difficulty that can arise across physical storage resources when placing application volumes is a failure to maintain idempotency. Generally, idempotency means that an operation that is applied multiple times will have the same result as the initial application without intervening actions. In the context of Ansible modules, idempotency means that one run of a playbook to set storage to a desired state will not have any changes with subsequent runs of the same playbook. Storage resources tend to have configuration drift over time due to manual changes and updates. Volume placement can lead to configuration drift as application storage demands shift, resulting in suboptimal storage utilization over time that calls for periodic intervention and reallocation of storage resources.

SUMMARY OF THE INVENTION

Therefore, a need has arisen for a system and method which automatically places application volumes in a selected resource out of available storage resources based on various criteria, such as class of service, available capacity and available load on the storage resource.

In accordance with the present invention, a system and method are provided which substantially reduce the disadvantages and problems associated with previous methods and systems. A storage volume request at a network having plural storage devices is automatically placed to achieve desired storage characteristics.

More specifically, plural client information handling systems interface through a network with plural storage devices in storage arrays, such as storage area network (SAN) and/or network attached storage (NAS) storage arrays, having plural storage resource pools with different characteristics. For example, one or more storage servers couple through NAS controllers with storage arrays of plural storage devices to store and retrieve information stored as storage volumes organized as storage groups. A request by a client information handling system to place a storage volume is automatically managed with a module distributed to a network resource, such as an Ansible collection having a placement role module. The placement role module identifiers storage resource pools having characteristics that meet constraints of the requested storage volume and automatically places the storage volume at a storage device of a storage resource pool selected to provide a desired performance. In addition, the placement role searches for storage group names at the storage devices that match the storage group name of the requested storage volume placement to maintain idempotency. When existing storage group names lack idempotency, an error is returned.

The present invention provides a number of important technical advantages. One example of an important technical advantage is that a storage utilization is improved, reducing storage cost and improving storage performance. For instance, by making volume placement decisions primarily based on available storage capacity and percentage of storage utilization across multiple storage arrays, the present disclosure balances the load across the multiple storage arrays to improve storage utilization. The improved storage utilization reduces the risk of provisioning being rejected by a storage array due to a lack of storage space. Playbook creation and application for Ansible module implementations is simplified, and a consistent volume placement strategy is provided as a part of an Ansible collection. Idempotency is maintained for volume placement, and failures of idempotency are identified for correction as manual changes and updates are performed, reducing the need and frequency of interventions, by ensuring that, if a storage group is placed on a storage array then further provisioning within that storage group is done on the same existing storage array. Another advantage is that information technology professionals may perform a series of "what-if" scenarios before making a final storage volume provisioning request, thus giving the information technology professional a better understanding of how various logical arrangements of storage resources might impact network performance.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information handling systems interface with networked storage having storage volumes placed to optimize storage capacity while maintaining idempotency. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
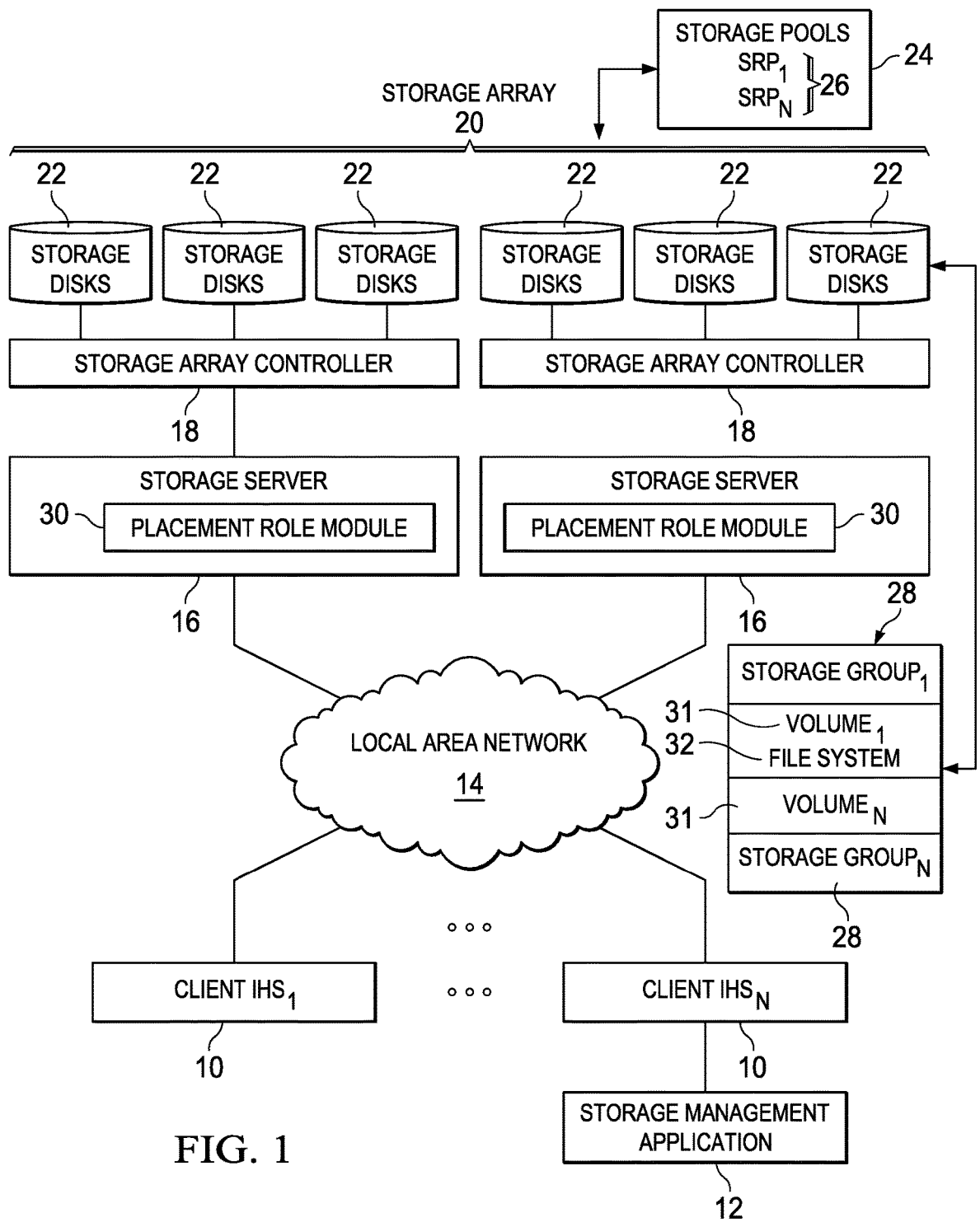
FIG. 1 depicts a block diagram of an information handling system network having distributed modules that automate placement of networked storage volumes.

Referring now to FIG. 1, a block diagram depicts an information handling system network having distributed modules that automate placement of networked storage volumes. In the example embodiment, plural client information handling systems 10 interface with a local area network (LAN) 14 that supports communication with networked storage resources, such as with Ethernet CATV cables or wireless communications. Client information handling systems 10 provide a variety of information processing functions that rely upon a distributed network of storage devices to store information, such as plural network attached storage (NAS) 20 resources. As an example, information handling systems 10 provide information processing for employees of an enterprise who perform a variety of functions, such as design, accounting, marketing, communications and other types of functions. Information technology (IT) professionals of the enterprise arrange different applications and storage resources for information handling systems 10. For instance, an engineering team might have computer assisted design (CAD) applications that share design folders and files to support collaboration across the team. In the same network environment, an accounting team might manage sensitive accounting information, such as costs, sales, and personnel compensation. IT professionals configure networked storage resources to address such diverse enterprise storage needs in a cost effective manner that provides efficient information storage and retrieval rates.

In the example embodiment, storage is provided by plural storage arrays 20, such as network attached storage (NAS) and/or storage area network (SAN) resources, that each have plural storage drives 22, such as solid state drives (SSD) having flash memory and hard disk drives having spinning magnetic discs. Physical access to the storage drives 22 is provided through a storage controller 18, such as a NAS and/or SAN controller, that includes a processor and memory as well as other resources to manage information communication, such switches. For instance, storage controller 18 may be an application specific integrated circuit (ASIC) or system on a chip (SOC) specialized to manage access to non-transitory memory so storage drives 22. As an example, storage drives 22 are configured as storage arrays under the management of one or more storage controllers 18. Also shown in the example embodiment are plural storage servers 16 interfaced with storage controllers 18 and local area network 14 to manage network accesses to storage drives 22 by client information handling systems 10. In various embodiments, other arrangements of storage drives and communication hardware may be used to support the networked storage as described herein.

The example embodiment depicts logical arrangements of the storage drives 22 that aid IT professionals in organizing storage resources to meet enterprise needs. One logical arrangement is the use of storage pools 24 that organize physical storage drive resources as storage resource pools (SRPs) 26 having similar characteristics, such as the memory read and write latency, storage capacity, flash versus spinning disc storage media, and more generalized characterizations of storage performance, such as service levels. IT professionals may select specific storage pools based upon the characteristics, such as the service level, to meet desired constraints for different types of applications. For instance, CAD applications might manage with a lower service level since end user's execute the application at client with powerful local processing while accounting and sales applications might call for a higher service level with reduced latency to help provide prompt customer interactions. Another example logical arrangement is the use of storage groups 28, which are each a collection of storage volumes 31 that each have a file system 32. Storage groups provide a logical segregation of information defined for access by specific end users. For example, a particular application or team might define a storage volume to share for a project or related information storage.

A storage management application 12 executing on a client information handling system 10 provides a tool for storage resource organization, such definitions of storage pools 24 and storage groups 28. In the example embodiment, management of storage resources is provided with Ansible modules managed by storage management application 12 and executed at various processing resources of the network. Specifically, in the example embodiment placement role modules 30 execute to provide automated placement of storage volumes 31 at storage drives 22 configured as disc arrays under the management of a storage controller 18 and storage server 16. For example, when an end user requests placement of an application storage volume, placement role modules 30 execute to seek to optimize storage capacity optimization of the storage resources while maintaining idempotency. Placement of the storage volume may seek to automatically meet constraints for a variety of criteria, such as class of service, available capacity, available load at a storage array and other factors. Storage management application defines an Ansible role, such as with a text editor, that distributes to storage asset processing resources for execution as a set of playbooks interfaced with other Ansible modules. By making storage volume placement primarily based on available storage capacity and percentage of storage utilization across multiple storage arrays, placement role module 30 balances load across multiple storage arrays and thereby improves storage utilization while reducing the risk that a provisioning request fails due to an improper storage array selection. The storage volume placement may be completely automated to place and provision the storage volume in response to a request at a storage drive or storage resource pool in response to the request, such as by provisioning the storage volume on the persistent storage of a drive and reporting completion in response to the request. Alternatively, storage volume placement may be presented for an end user to accept or to bypass for a manual placement where desired for backwards compatibility with less automated processes and manual playbooks.

Figure 2:
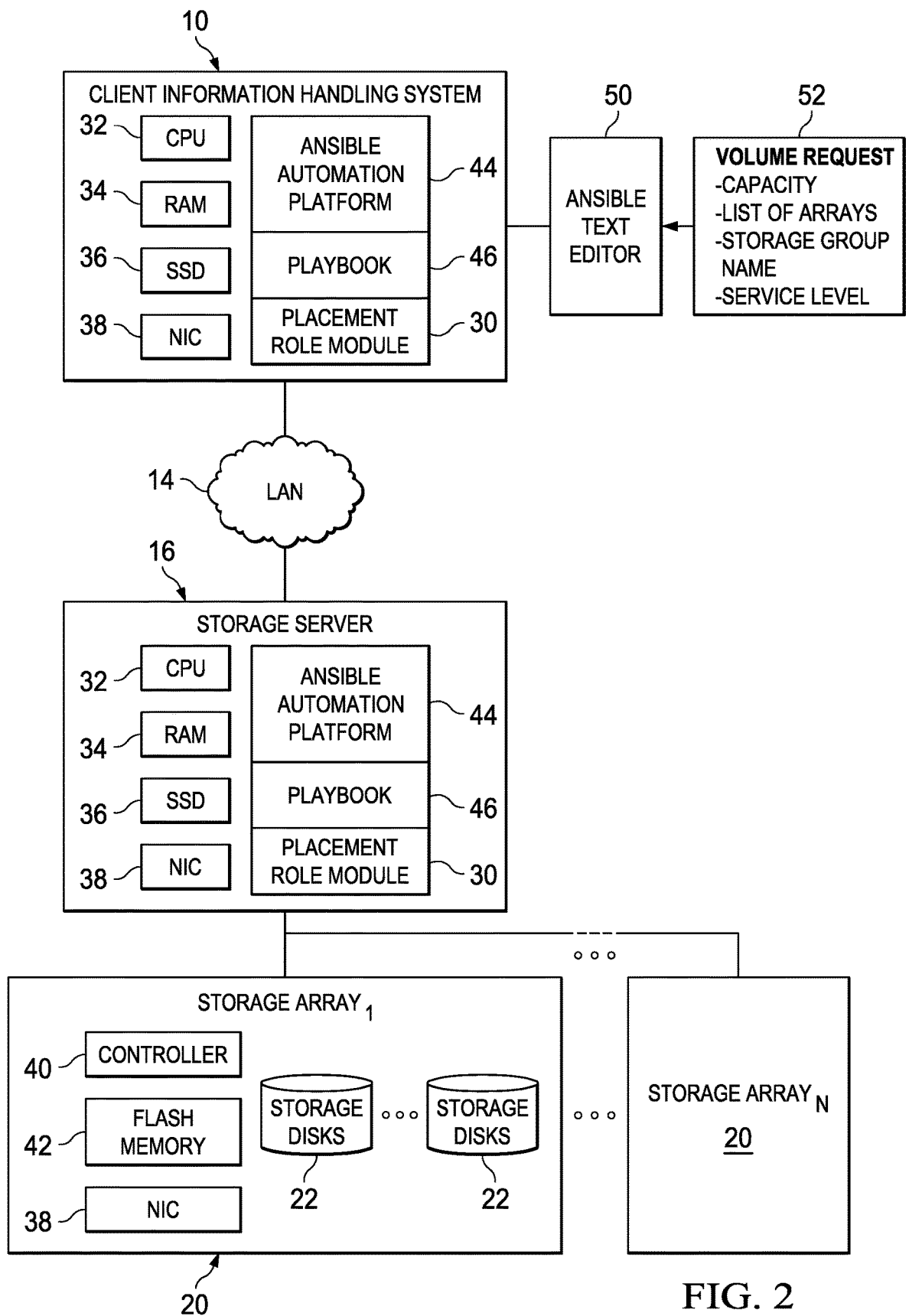
FIG. 2 depicts a block diagram of information handling systems that cooperate to automate placement of networked storage volumes.

Referring now to FIG. 2, a block diagram depicts information handling systems that cooperate to automate placement of networked storage volumes. Client information handling system 10 processes information with processing components disposed in a housing, such as a housing having a portable or stationary configuration. A central processing unit (CPU) 32 executes instructions to process information with the instructions and information stored in a random access memory (RAM) 34. A solid state drive (SSD) 36 or other persistent storage device provides non-transitory memory to store information during power down periods, such as an operating system and applications that execute on CPU 32 at power up by retrieval from SSD 36 to RAM 34. A network interface card (NIC) 38 supports network communications, such as with Ethernet cables that define a local area network (LAN) 14. In the example embodiment, client information handling system 10 executes an Ansible automation platform 44 retrieved from SSD 36 to perform management functions associated with storage array 20 resources interfaced to LAN 14 through a storage server 16. Storage server 16 includes processing components that cooperate to perform server functions, such as serving information in response to reads and writes by client information handling systems. In the example embodiment, server information handling system 16 includes a CPU 32, RAM 34, SSD 36 and NIC 38 that operate similar to a client information handling system 10. As server information handling system 10 receives information reads and writes from LAN 14, it commands storage array 20 to perform the reads and writes with communications to a controller 40, such as an ASIC or SOC that executes instructions stored in flash memory 42 or other non-transient memory, to communicate the information through a NIC 38 to and from storage drives 22. Ansible automation platform 44 is accessed by an end user through a text editor 50 that defines an Ansible playbook 46 and a placement role module 30 for automated storage volume requests as described above.

As is illustrated in the example embodiment, a storage volume request 52 is provided to placement role module 30 in cooperation with Ansible automation platform 44 and passed to server information handling system 16 and storage array 20 resources. Placement role module 30 may included Ansible roles that are distributed to various processing resources of the storage network, such as CPU 32 or server information handling system 10, controller 40 or storage array 20 or other processing resources that cooperate to manage storage reads and writes. Ansible roles are essentially a playbook directed towards a network function. A storage volume request 52 may include a variety of constraints that define what characteristics an assigned storage resource pool should have to meet the request. In the example embodiment, a storage volume request may include a capacity, a list of storage arrays, a storage group name and a service level. The storage volume request constraints are communicated to a placement role module 30 that performs analysis to determine an optimal storage resource pool for provisioning of the storage volume, as described above.

Figure 3:
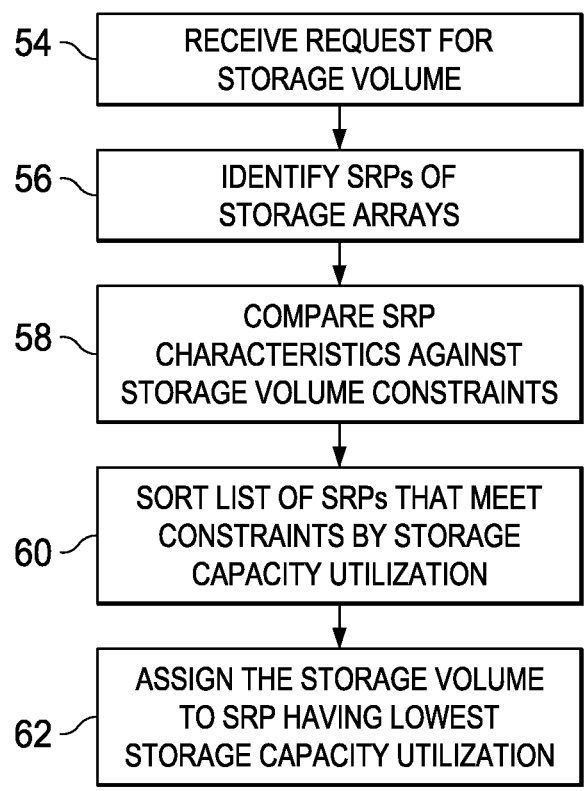
FIG. 3 depicts a flow diagram of automated placement of networked storage volumes.

Referring now to FIG. 3, a flow diagram depicts a process for automated placement of networked storage volumes. The process starts at step 54 with receipt of a request for creation or provisioning of a networked storage volume. At step 56, storage resource pools of storage arrays of the network are identified that meet the storage volume request constraints. As an example, the identification is performed by a "gather facts" Ansible module that searches the network for characteristics of storage arrays for comparison against constraints defined by the storage volume request. At step 58 a comparison is performed between the storage resource pool characteristics and the storage volume request constraints to identify storage resource pools that meet the storage volume request constraints. At step 60, once a list of storage resource pools is defined then meets the storage volume constraints, the list of storage resource pools is prioritized by storage capacity utilization. At step 62 the storage volume is assigned to the storage resource pool having the lowest storage capacity utilization. In one embodiment, the storage volume is automatically provisioned to the selected storage resource pool so that the storage volume is prepared for access through the network.

Figure 4:
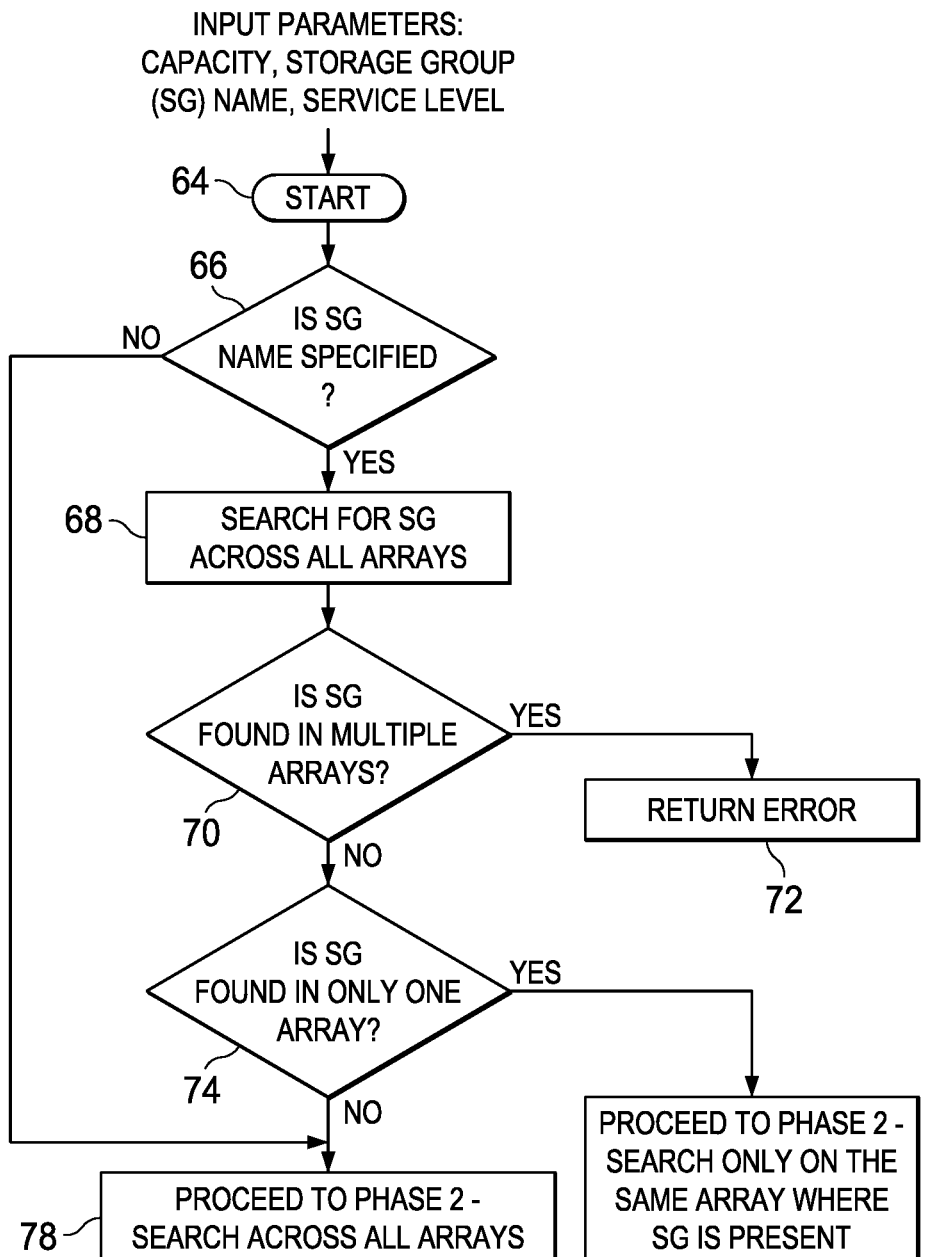
FIG. 4 depicts a flow diagram of a process for storage volume placement that maintains idempotency.

Referring now to FIG. 4, a flow diagram depicts a process for storage volume placement that maintains idempotency.

The process starts at step 64 with input parameters that define constraints for the networked storage volume, including capacity, storage group name and service level. In some instances, the storage group name and service level may be optional. At step 66 a determination is made of whether the storage group name is specified. If not, idempotency is not an issue and the process continues to step 78 to search the storage arrays for available resources. If the storage group name is specified, the process continues to step 68 to search across all of the storage arrays for the storage group name in multiple storage arrays. At step 70, if the storage group name is found in multiple storage arrays, the process continues to step 72 to indicate an idempotency error. If at step 70 the storage group name is not found in multiple storage arrays, the process continues to step 74 to determine if the storage group name is found in only one storage array. If the storage group name is not found in one storage array, the process continues to step 78 to search all storage arrays for resources that meet the storage volume constraints. If at step 74 the storage group is found in only one storage array, the process continues to step 76 to search only that storage array from the list of storage arrays to determine if storage resources meet the storage volume constraints.

Figure 5:
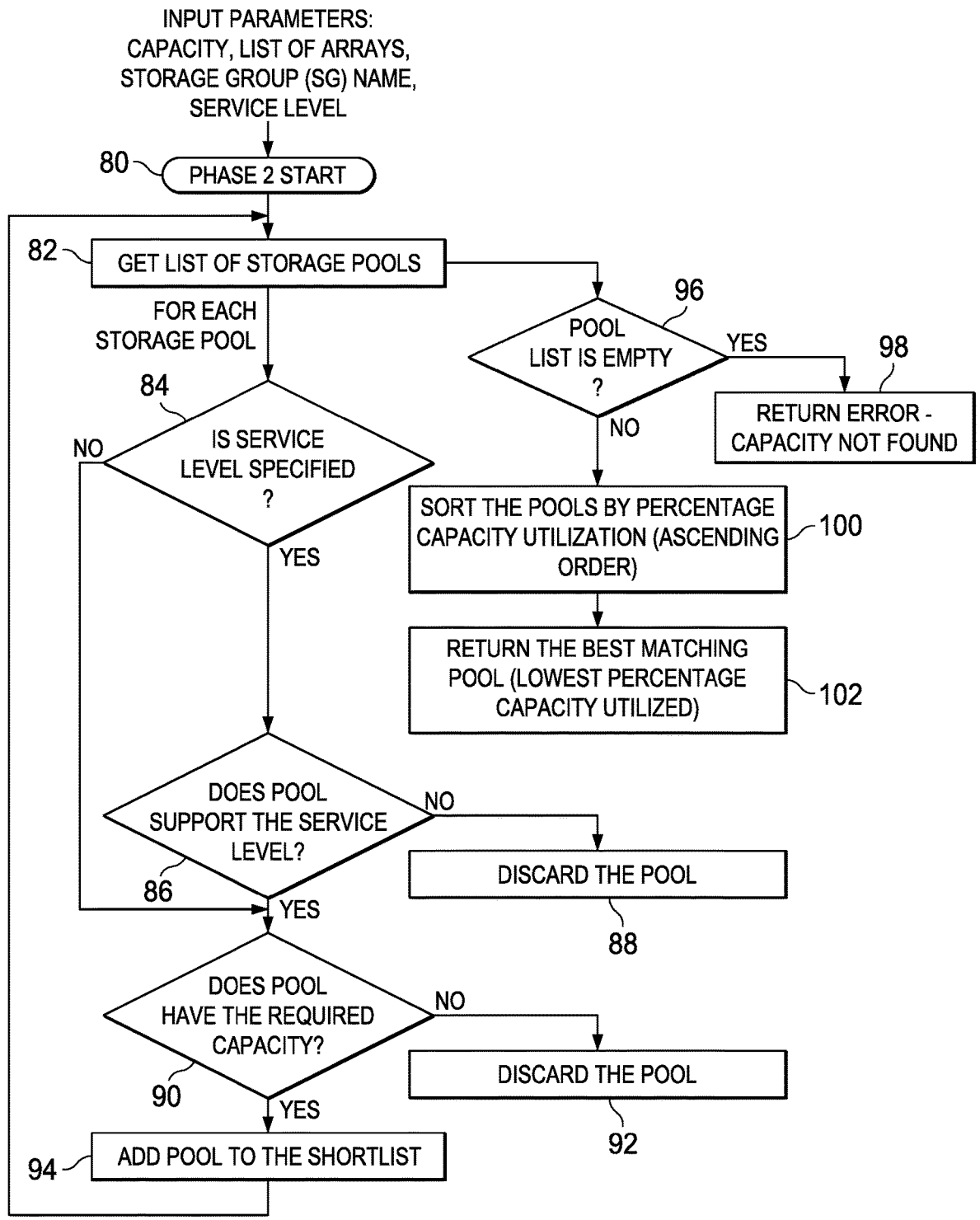
FIG. 5 depicts a flow diagram of a process for storage volume placement with storage capacity optimization.

Referring now to FIG. 5, a flow diagram depicts a process for storage volume placement with storage capacity optimization. The process starts at step 80 with the list of storage arrays that meet the storage volume request constraints. For example, if no storage group name match was found, then all found storage arrays may be analyzed against the storage volume constraints; if one storage group name match was found, then the associated storage array is compared against the storage volume constraints. The process continues to step 82 to get the list of storage pools for consideration and then for each storage pool, the process continues to step 84 to determine if a service level constraint is specified for the storage volume. If no service level is specified, the process continues to step 90. If a service level is specified at step 84 the process continues to step 86 to compare the storage volume request constraints against the storage pool support characteristics for service level. If the storage pool fails to meet the required service level, the process continues to step 88 to discard the storage pool and returns to step 82 to continue checking the list of storage pools. If the storage pool meets the service level required, the process continues to step 90 to determine if the storage pool has the required storage capacity. If not, the process continues to step 92 to discard the storage pool and then returns to step 82 to check the rest of the list of storage pools. If the storage pool has the required capacity, the process continues to step 94 to add the storage pool to the list of storage pools that are acceptable for provisioning to the storage volume. Where a storage volume is checked for placement to an existing storage group, incremental capacity is compared, meaning by how much the requested capacity is greater than what is already being used by the storage group. Once the list at 82 is limited to the storage pools that meet the storage volume request constraints, the process continues to step 96 to determine if the list is empty. If the list is empty, the process continues to step 98 to return an error that storage capacity is not found. If the list is not empty at step 96, the process continues to step 100 to sort the list of storage pools by percentage capacity utilization. At step 102, the storage pool having the best match, such as the lowest percentage capacity utilized, is returned for use to provision the storage volume.

In summary, where neither a storage group name nor service level are specified, a search is performed for the required capacity across all storage arrays. This basic use case searches for capacity without concern regarding service level and idempotency. If the storage group name is not specified but the service level is specified, the search is performed across all storage arrays that support the required service level. If a storage group name is specified but does not exist on any storage array, a first provisioning is taking place and idempotency is not an issue. If the storage group name exists only one storage array, only that storage array is checked for sufficient incremental capacity and, if specified, the service level. If the storage group name is specified and exists on multiple storage arrays, idempotency is an issue and corrective action is taken before provisioning the storage volume.

Although the present invention has been described in detail, it should be understood that various changes, substitutions and alterations can be made hereto without departing from the spirit and scope of the invention as defined by the appended claims.

What is claimed is:

1. An information handling system comprising:
   a processor operable to execute instructions that process information;
   a memory interfaced with the processor and operable to store the instructions and information;
   a network interface card interfaced with the processor and operable to communicate with a network; and
   a non-transitory memory storing instructions that when executed on the processor:
   identify plural storage resource pools in plural storage arrays interfaced with the network;
   compare characteristics of each of the plural storage resource pools against constraints of a storage volume request to list those of the plural storage resource pools that meet the constraints;
   sort the list by storage capacity utilization;
   assign the storage volume to the storage resource pool of the list having the lowest storage capacity utilization;
   search the network for a storage group name associated with the storage volume request;
   when the storage group name is found in only one storage array, limit the list to only storage pools of the one storage array; and
   return an idempotency error when the storage group name is found in the plural storage arrays.

2. The information handling system of claim 1 wherein the instructions further compare all of the plural storage resource pools when the storage group name is not found in the plural storage arrays.

3. The information handling system of claim 2 wherein the characteristics compared with constraints include at least a service level supported by the storage resource pools and a service level requirement of the storage volume.

4. The information handling system of claim 2 wherein the characteristics compared with constraints include at least a storage capacity available at the storage resource pools and a storage capacity requirement of the storage volume.

5. The information handling system of claim 4 wherein the instructions further:
   compare the storage volume requested storage capacity against the storage resource pools available capacity when the storage group name is not found by the search; and
   compare the storage volume incremental capacity when the storage group name is found by the search.

6. The information handling system of claim 4 wherein the instructions further return a capacity error when the no storage resource pools have the storage volume requested storage capacity.

7. The information handling system of claim 1 wherein the instructions comprise an Ansible role.

8. A method for placing a storage volume at a network having plural storage arrays, the method comprising:
identifying plural storage resource pools in the plural storage arrays interfaced with the network;
comparing characteristics of each of the plural storage resource pools against constraints of a storage volume request to list those of the plural storage resource pools that meet the constraints;
sorting the list by storage capacity utilization;
assigning the storage volume to the storage resource pool of the list having the lowest storage capacity utilization;
searching the network for a storage group name associated with the storage volume request;
when the storage group name is found in only one storage array, limiting the list to only storage pools of the one storage array; and
returning an idempotency error when the storage group name is found in the plural storage arrays.

9. The method of claim 8 further comprising:
comparing all of the storage pools when the storage group name is not found in the plural storage arrays.

10. The method of claim 8 wherein the characteristics compared with constraints include at least a service level supported by the storage resource pools and a service level requirement of the storage volume.

11. The method of claim 8 wherein the characteristics compared with constraints include at least a storage capacity available at the storage resource pools and a storage capacity requirement of the storage volume.

12. A method for placing a storage volume at a network having plural storage arrays, the method comprising:
identifying plural storage resource pools in the plural storage arrays interfaced with the network;
comparing characteristics of each of the plural storage resource pools against constraints of a storage volume request to list those of the plural storage resource pools that meet the constraints, the characteristics compared with constraints including at least a storage capacity available at the storage resource pools and a storage capacity requirement of the storage volume;
sorting the list by storage capacity utilization;
assigning the storage volume to the storage resource pool of the list having the lowest storage capacity utilization;
searching the network for a storage group name associated with the storage volume request;
when the storage group name is found in only one storage array, limiting the list to only storage pools of the one storage array;
comparing the storage volume requested storage capacity against the storage resource pools available capacity when the storage group name is not found by the search; and
comparing the storage volume incremental capacity when the storage group name is found by the search.

13. A method for placing a storage volume at a network having plural storage arrays, the method comprising:
searching the network for a storage group name associated with a storage volume placement request;
when the storage group name is found in only one storage array, limiting placement of the storage volume to only the one storage array;
returning an idempotency error when the storage group name is found in the plural storage arrays;
identifying plural storage resource pools in the plural storage arrays interfaced with the network;
comparing characteristics of each of the plural storage resource pools against constraints of the storage volume placement request to list those of the plural storage resource pools that meet the constraints;
sorting the list by storage capacity utilization;
assigning the storage volume to the storage resource pool of the list having the lowest storage capacity utilization;
comparing all of the plural storage resource pools when the storage group name is not found in the plural storage arrays; and
comparing only storage resource pools of the list having the storage group name when the storage group name is found in only one array.

14. The method of claim 13 wherein the characteristics compared with constraints include at least a service level supported by the storage resource pools and a service level requirement of the storage volume.

* * * * *